Jan. 13, 1931.　　　　G. M. RICHARD　　　　1,789,191
BELT LACING HOOK
Filed Nov. 11, 1929
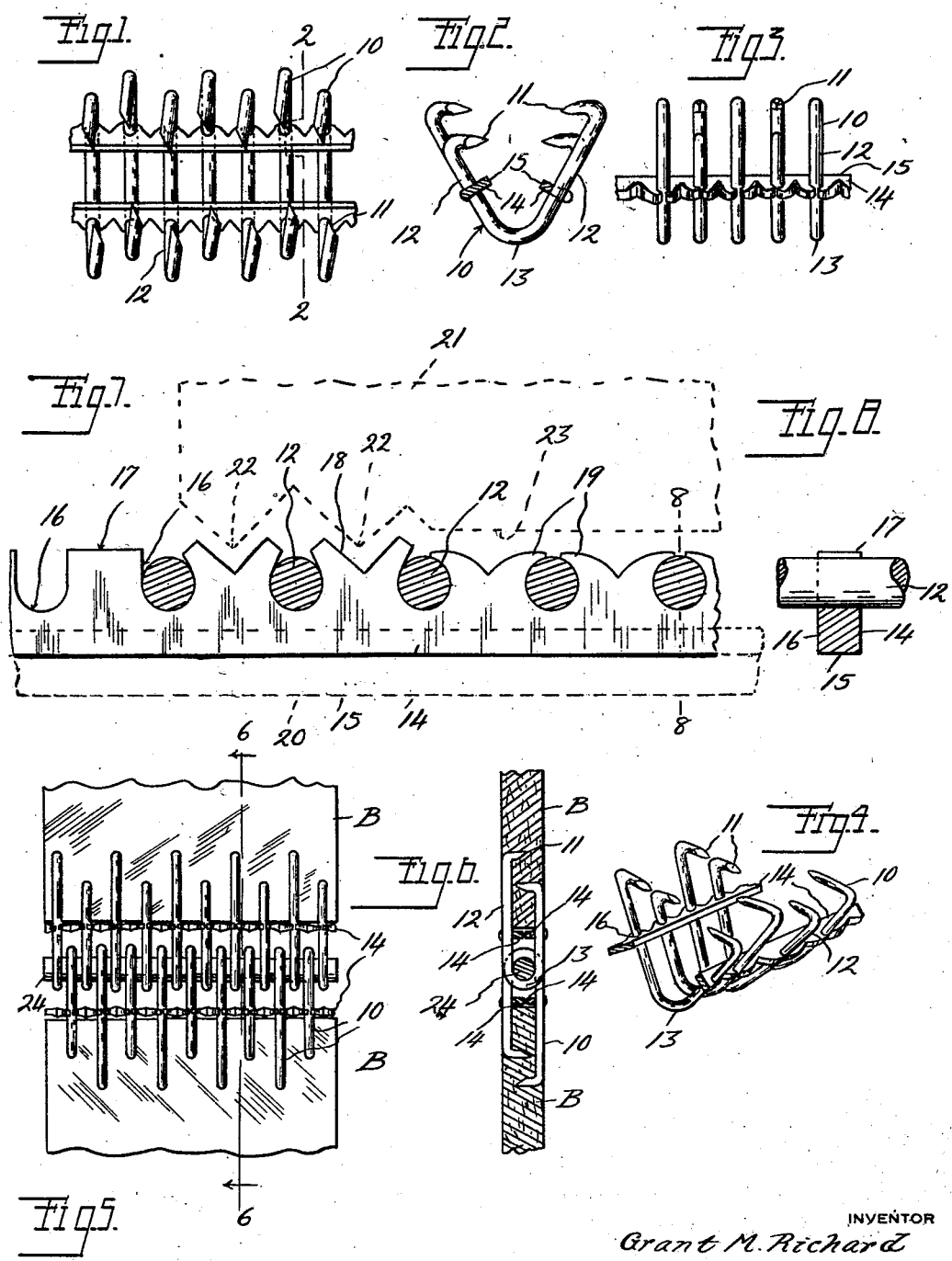
INVENTOR
Grant M. Richard
BY
ATTORNEYS Patented Jan. 13, 1931

1,789,191

UNITED STATES PATENT OFFICE

GRANT M. RICHARD, OF TOLEDO, OHIO, ASSIGNOR TO SAFETY BELT LACER COMPANY, OF TOLEDO, OHIO, A CORPORATION OF DELAWARE

BELT-LACING HOOK

Application filed November 11, 1929. Serial No. 406,485.

This invention relates to belt lacing hooks and more particularly to an improved strip of belt lacing hooks.

The invention relates to a series or plurality of wire belt hooks permanently assembled in strip form and capable of being employed for joining belt ends; the invention having as one of its important objects to simplify, render more efficient and improve generally structure of this character.

Another object of this invention is to provide a lacking hook strip which may be readily and economically manufactured in large quantities at a minimum cost to produce a finished article which is strong and durable and otherwise commercially acceptable and satisfactory.

The several objects and advantages of this invention will be made more apparent as this description proceeds, especially when considered in connection with the accompanying drawing, wherein Figure 1 is a top plan view of a portion of a strip of belt lacing hooks constructed in accordance with this invention;

Figure 2 is a sectional view taken substantially on the plane indicated by line 2—2 in Figure 1;

Figure 3 is a side elevational view of a portion of a strip of belt lacing hooks;

Figure 4 is a fragmentary perspective view of the belt lacing hook strip;

Figure 5 is a plan view showing my improved belt lacing applied to the ends of a belt;

Figure 6 is a fragmentary sectional view taken substantially on the plane indicated by line 6—6 in Figure 5;

Figure 7 is an enlarged semi-diagrammatic view showing the manner in which the hooks and lacing bars are assembled and connected; and Figure 8 is a fragmentary sectional view taken substantially on the line 8—8 in Figure 7.

The herein described type of belt lacing hook strip differs from the other principal commercial type in that the plurality or series of hooks are permanently assembled in strip form in spaced predetermined parallel relation to one another. In the other principal type of commercial hook the hooks are but loosely or temporarily assembled in strip form. The instant invention constitutes an improvement of the belt lacing hook strip shown and claimed in United States Patent No. 1,653,791, dated December 27, 1927, and owned by the assignee of the instant invention.

Belt lacing hooks permanently assembled in strip form offer many advantages not realized with the other principal commercial form of belt lacing heretofore mentioned, but notable among these advantages is the ease with which a permanent strip of belt lacing hooks may be applied to the belt ends without the use of the usual belt hook lacing machines, and secondly, the reinforcement afforded the end hooks which prevents the same from becoming loosened and disengaged from the belt at the edges thereof.

In forming a belt lacing hook strip in accordance with my invention I employ a plurality of standard form belt hooks 10 made of steel wire or other suitable material and formed in a substantial V shape, as shown most clearly in Figure 2. The ends 11 of each belt hook are sharpended and bent inwardly, and it is the general practice to make one end of each hook shorter than the other and to arrange the hooks in series with alternately long and short arms at each side of the series of hooks. Each hook comprises, in addition to the point ends 11, straight leg portions 12 terminating in a bowed or curved apex 13.

A series of belt hooks are arranged in spaced parallel relation and are adapted to be permanently united by means of one or more lacing bars 14.

In the present disclosure two of such lacing bars are illustrated, one associated with each of the series of legs 12 of the belt hooks. However, it is within the scope of this invention to employ, for instance, one lacing bar or a plurality thereof, as may be found necessary or expedient.

Each lacing bar is preferably, although not necessarily, rectangular in cross section, but in accordance with this invention it is essential that the lacing bar initially have a substantially straight or smooth edge portion 15. In the illustrated embodiment of the invention the lacing bar 14 is shown as rectangular in cross section and provided with two substantially straight parallel upper and lower edges, for instance, see Figures 7 and 8. The lacing bar 14 is then perforated or otherwise acted upon to form recesses 16 in one longitudinal edge thereof, these recesses being of such size as to substantially snugly receive the legs 12 of the belt hooks. Moreover, the recesses are preferably of such depth that when the legs of the belt hooks are engaged in the recesses, they are below the plane of the upper edge 17 of the lacing bar. (See particularly Figure 7.)

The belt lacing hooks and lacing bars are then permanently united by a swaging operation which flows or spreads the metal in the edge of the bar between adjacent recesses laterally toward the recesses to substantially close the open ends of the recesses and to thus cause the metal in the lacing bar to embrace the legs of the belt hooks whereby the removal thereof from the recesses is prevented.

In Figure 7, which semi-diagrammatically and progressively shows the manner in which the hooks and lacing bar are united, it will be noted that first V-shaped grooves 18 are formed in the edge 17 of the lacing bar between the spaced legs 12 of the belt hooks. This initially deflects or spreads the metal of the belt lacing bear laterally toward the adjacent legs 12, and in the next operation this metal is completely swaged as indicated at 19 and substantially closes the open ends of the recesses 16. This deformation of the metal causes a rigid embracing engagement with the lacing bar of the belt hooks to prevent the accidental disengagement thereof and to permanently assemble the series of belt hooks into a strip.

The lower straight or plain edge 15 of the bar affords the means for firmly and adequately supporting the lacing bar 14 during the swaging operation, and as seen from Figure 7, the lacing bar may be supported in a grooved support 20. When thus supported the swaging die 21, shown in dotted lines in Figure 7, can be brought into engagement with the upper edge of the lacing bar to form the V-shaped grooves 18 and to subsequently completely swage and spread the metal as shown at 19. This swaging action may be accomplished for instance by a single swaging member having the pair of wedge-shaped projections 22 and the flat surface 23.

The structure is preferably, although not necessarily, formed in a continuous strip, which is subsequently cut to the desired length.

In assembling the belt lacing with the belt ends B the lacing bars 14 are usually brought into abutting relation with the edges of the belt at the ends thereof, as most clearly illustrated in Figures 5 and 6. Such an arrangement, while of advantage in connection with leather belts and the like is of particular advantage in connection with fabric belts, as the engagement of these lacing bars with the ends of fabric belts prevents the same from unravelling and thus lengthens the life and consequent usefulness of the belt. After a strip has been associated with each belt end the loops are brought into overlapping relation and a pin 24 is passed therethrough, as is generally customary.

Obvious improvements will suggest themselves to those skilled in this art, and to this end reservation is made to make such changes as may come within the purview of the accompanying claims.

I claim as my invention:

1. In a belt hook lacing, a plurality of belt hooks, and a lacing bar having a serrated edge adapted to receive the shanks of the hooks in said serrations, the serrated edge of said bar being swaged substantially around said hook shanks.

2. In a belt hook lacing a plurality of belt hooks, and means for rigidly uniting said hooks comprising a bar having one edge thereof serrated, the shanks of the hooks being engaged in said serrations, the serrated edge of said bar being swaged into embracing engagement with said hook shanks to permanently unite said hooks and bar.

3. In a belt hook lacing, a plurality of belt hooks and means for uniting said hooks comprising a bar having one portion providing a substantially flat unbroken surface, another portion of the bar being serrated to provide recesses for receiving the shanks of said hooks, the bar being secured to said hooks by swaging the serrated portion thereof.

4. In a belt hook lacing, a plurality of belt hooks arranged in spaced parallel relation and means for rigidly uniting said hooks comprising a bar having a straight edge and a plurality of spaced recesses in its opposite edge engageable respectively with said hooks, the material between said recesses being spread laterally by swaging, while supporting said bar on its straight edge, to confine said hooks in said depressions.

In testimony whereof I affix my signature.

GRANT M. RICHARD.